(12) United States Patent
Shampine

(10) Patent No.: US 12,074,553 B2
(45) Date of Patent: Aug. 27, 2024

(54) SYSTEM AND METHOD FOR STOPPING ELECTRICALLY POWERED FRACTURING PUMPS

(71) Applicant: Schlumberger Technology Corporation, Sugar Land, TX (US)

(72) Inventor: Rod William Shampine, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 586 days.

(21) Appl. No.: 17/070,065

(22) Filed: Oct. 14, 2020

(65) Prior Publication Data
US 2021/0126561 A1     Apr. 29, 2021

Related U.S. Application Data

(60) Provisional application No. 62/924,721, filed on Oct. 23, 2019.

(51) Int. Cl.
*H02P 3/24* (2006.01)
*E21B 43/26* (2006.01)
(Continued)

(52) U.S. Cl.
CPC ............... *H02P 3/24* (2013.01); *F04B 17/03* (2013.01); *F04B 49/02* (2013.01); *F04B 49/06* (2013.01); *E21B 43/26* (2013.01)

(58) Field of Classification Search
CPC ...... E21B 43/26; E21B 43/2607; F04B 17/03; F04B 49/02; F04B 49/022; F04B 49/06; H02P 3/24
See application file for complete search history.

(56) References Cited

U.S. PATENT DOCUMENTS

| 2,818,539 A | 12/1957 | Johnson |
| 6,417,644 B2 | 7/2002 | Hammond et al. |

(Continued)

FOREIGN PATENT DOCUMENTS

| CN | 106655921 | * | 5/2010 | |
| CN | 106655921 A | * | 5/2017 | ............. B64D 31/12 |
| DE | 10 2019207254 | * | 10/2019 | |

OTHER PUBLICATIONS

"Batteries in Transport—applicable U.S. Hazardous Materials Regulations and International Dangerous Goods Regulations", PRBA—the Rechargable Battery Association, Mar. 2017, 4 pages; available at: www.prba.org/wp-content/uploads/Overview-of-Battery-Transport-Regulations.pdf.
(Continued)

*Primary Examiner* — Thai T Dinh
(74) *Attorney, Agent, or Firm* — Michael L. Flynn

(57) ABSTRACT

A technique facilitates a fracturing operation in a borehole and surrounding formation. The technique utilizes braking to arrest the rotation of an electric frac system and to thus limit the magnitude of a pressure peak in the event of an over-pressure shut down or other type of emergency shutdown. According to an embodiment, an electric motor is coupled with a fracturing pump which may be operated to pump a fracturing fluid into a well. Stopping or otherwise braking of the electric frac system is facilitated by applying rotor drag to a rotor of the electric motor.

20 Claims, 3 Drawing Sheets

(51) Int. Cl.
    *F04B 17/03*     (2006.01)
    *F04B 49/02*     (2006.01)
    *F04B 49/06*     (2006.01)

(56) References Cited

U.S. PATENT DOCUMENTS

| | | | |
|---|---|---|---|
| 7,901,314 | B2 | 3/2011 | Salvaire et al. |
| 9,587,649 | B2 * | 3/2017 | Oehring .................. H02K 9/04 |
| 10,378,335 | B2 * | 8/2019 | Chong .................. E21B 47/117 |
| 11,473,413 | B2 * | 10/2022 | Yeung .................... F04B 17/05 |
| 11,476,781 | B2 * | 10/2022 | Oehring ................. F04B 49/20 |
| 2014/0274557 | A1 * | 9/2014 | Chong .................... E21B 47/10 |
| | | | 477/79 |
| 2016/0194942 | A1 * | 7/2016 | Wiegman ................ F04B 17/03 |
| | | | 166/250.15 |
| 2016/0208592 | A1 * | 7/2016 | Oehring ............. F04D 29/5806 |

OTHER PUBLICATIONS

"Dual Frequency Braking", Application and Operations, In: Product User Manual, Chapter 6.16, 2010, pp. 176-179.

\* cited by examiner

SYSTEM AND METHOD FOR STOPPING ELECTRICALLY POWERED FRACTURING PUMPS

CROSS-REFERENCE TO RELATED APPLICATION

The present document is based on and claims priority to U.S. Provisional Application Ser. No. 62/924,721, filed Oct. 23, 2019, which is incorporated herein by reference in its entirety.

BACKGROUND

Hydrocarbon fluids such as oil and natural gas are obtained from a subterranean geologic formation, referred to as a reservoir, by drilling a well. The well may contain at least one wellbore into which various types of equipment are deployed to prepare the wellbore for production. Sometimes the well is prepared via fracturing operations performed prior to fully completing the well for production. In fracturing operations, fracturing pumps (sometimes referred to as frac pumps) are used at a wellsite to pump fracturing fluid downhole and out into the surrounding formation so as to fracture the formation in a manner which enhances production from the well. Frac pumps may be driven by various types of internal combustion engines. However, some frac pumps are powered via an electric motor controlled by a variable frequency drive (VFD).

In conventional diesel powered systems, over-pressure shut down may be accomplished by releasing a clutch in a transmission. Once the clutch disconnects the diesel engine and the frac pump, the frac pump stops very rapidly. In electric systems, however, the kinetic energy stored in the electric motor is quite large and such systems are not normally equipped with clutches. As a result, a substantial amount of detrimental pumping can occur after an over-pressure event (or other event) triggering an emergency shutdown. The substantial amount of detrimental pumping can lead to unwanted pressure peaks in the system.

SUMMARY

In general, a methodology and system are provided for facilitating braking to arrest the rotation of an electric frac system and to thus limit the magnitude of a potential pressure peak in the event of an over-pressure shut down or other type of emergency shutdown. According to an embodiment, an electric motor is coupled with a fracturing pump which may be operated to pump a fracturing fluid into a well. Stopping or otherwise braking of the electric frac system is facilitated by applying rotor drag to a rotor of the electric motor.

However, many modifications are possible without materially departing from the teachings of this disclosure. Accordingly, such modifications are intended to be included within the scope of this disclosure as defined in the claims.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

The disclosure herein generally involves a methodology and system which facilitate braking to arrest the rotation of an electric frac system. For example, the technique enables stopping of electric fracturing pumps in a timely manner when an over-pressure shutdown is experienced or in the event of other occurrences which call for quickly stopping the electric frac system. Effectively, the quick shutdown limits the magnitude of a pressure peak in the frac system due to the over-pressure shut down or other type of emergency shutdown.

According to an embodiment, an electric frac system comprises an electric motor coupled with a fracturing pump. The fracturing pump may be operated to pump a fracturing fluid into a well to, for example, perform a fracturing operation in the surrounding formation. Stopping or otherwise braking of the electric frac system is accomplished by applying rotor drag to a rotor of the electric motor. By way of example, a magnetic field may be applied to a stator of the electric motor to create the rotor drag. The magnetic field produces braking eddy currents in the rotor which create the desired drag. Depending on the parameters of a given system, application of the magnetic field may comprise applying a non-rotating magnetic field and/or a slowly rotating magnetic field to the stator.

Figure 1:
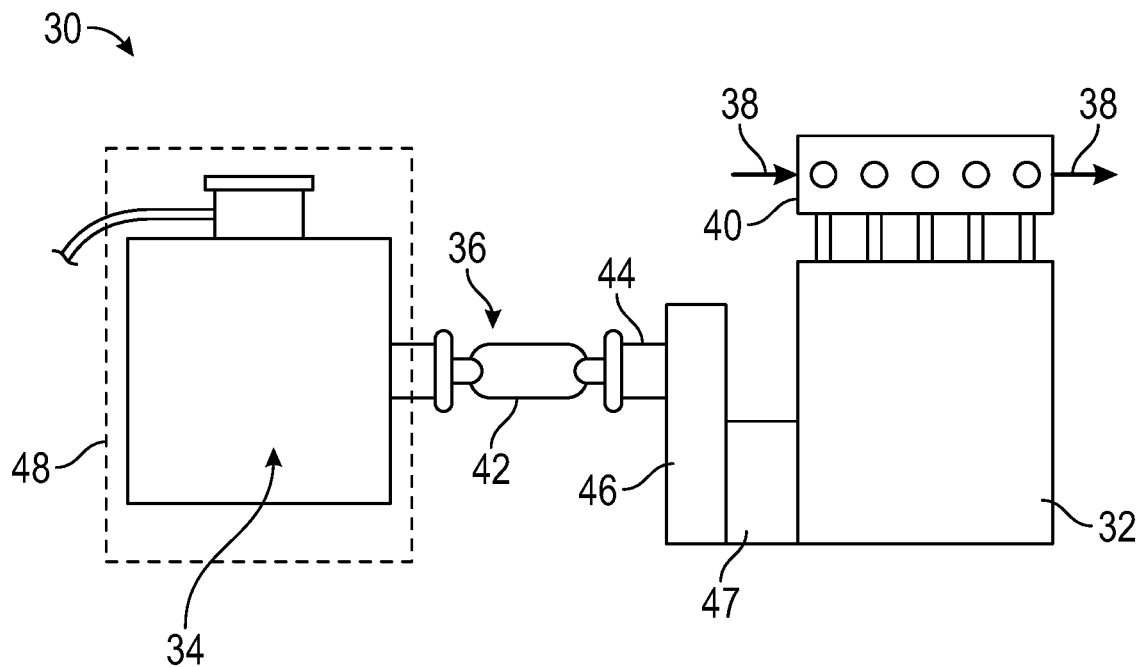
FIG. 1 is a schematic illustration of an example of one type of electric frac system which may be used to implement a fracturing operation at a wellsite, according to an embodiment of the disclosure.

Referring generally to FIG. 1, an example of an electric fracturing (frac) system 30 is illustrated. In this embodiment, a frac pump 32 is powered by an electric motor 34. The electric motor 34 is connected to the frac pump 32 by a driveline 36 which drives the frac pump 32 to pump and thus to substantially increase the pressure of a fracturing fluid 38 at a fluid end 40 of frac pump 32. By way of example, the driveline 36 may comprise a primary driveshaft 42 coupled with electric motor 34. At an opposite end, the primary driveshaft 42 may be connected to an input shaft 44 which drives an offsetting gearbox 46. The offsetting gearbox 46 is connected to frac pump 32 via a planetary gearbox 47 to drive the frac pump 32.

Additionally, the electric motor 34 is connected with an energy dissipation system 48 which is described in greater detail below. In general, the energy dissipation system 48 provides braking to arrest rotation of the electric frac system 30, e.g. applies braking to resist rotation of frac pump 32 and electric motor 34. For example, the technique/energy dissipation system 48 enables stopping of the electric frac pump 32 in a timely manner when an over-pressure shutdown is experienced during pumping of fracturing fluids downhole into a well. However, the energy dissipation system 48 also may be used to facilitate braking in the event of other occurrences which call for quickly stopping the electric frac system 30. Effectively, the quick shutdown limits the magnitude of a pressure peak in the electric frac system 30 and/or in the tubing string extending downhole for performance of the fracturing operation.

The braking may be achieved by applying rotor drag to a rotor of the electric motor 34. In some embodiments, the rotor drag is produced by applying a non-rotating magnetic field to a stator of the electric motor 34 which, in turn, produces braking eddy currents in the rotor. However, the rotor drag also may be produced by applying a slowly rotating magnetic field to the stator to produce the desired braking eddy currents. Also, a non-rotating magnetic field and a slowly rotating magnetic field may be used in various combinations to produce the desired braking. In some embodiments, the braking is achieved via a combination of rotor drag and resistance to rotation due to pumping action of the fracturing pump 32.

Figure 2:
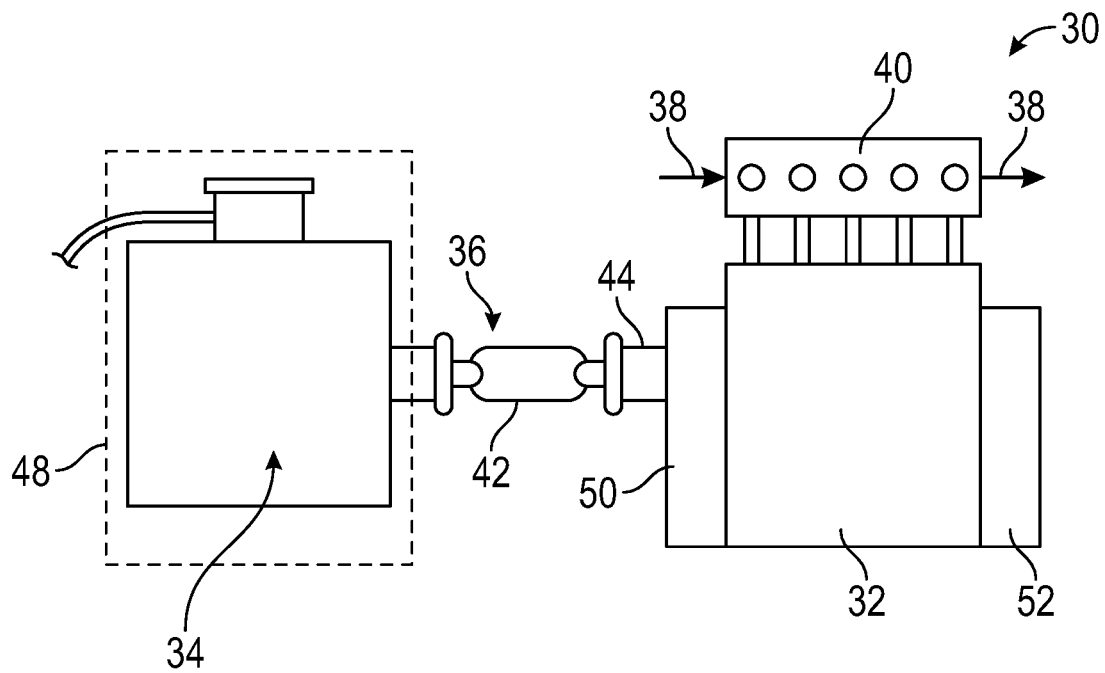
FIG. 2 is a schematic illustration of another example of an electric frac system which may be used to implement a fracturing operation at a wellsite, according to an embodiment of the disclosure.

Referring generally to FIG. 2, another example of electric fracturing (frac) system 30 is illustrated. In this embodiment, frac pump 32 is again powered by electric motor 34. The electric motor 34 is connected to the frac pump 32 by driveline 36 which drives the frac pump 32. In this example, the driveline 36 may comprise primary driveshaft 42 coupled with electric motor 34. At an opposite end, the primary driveshaft 42 is connected to input shaft 44 which drives two bull gears in a pair of gearboxes 50, 52. The gearboxes 50, 52 are coupled with the frac pump 32. Fluid end 40 of frac pump 32 is again used to boost the pressure of treating fluids, e.g. fracturing fluids 38. Energy dissipation system 48 is similarly coupled with electric motor 34.

Figure 3:
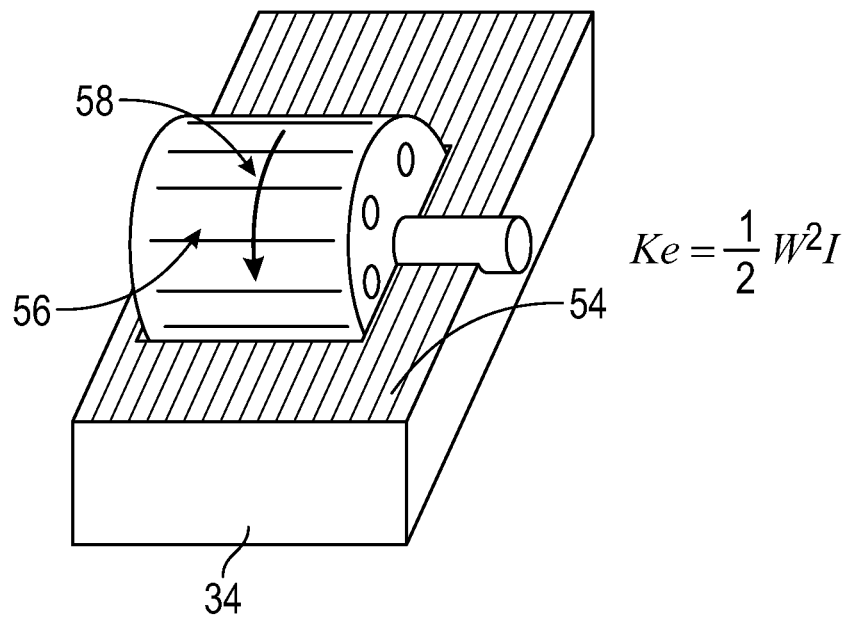
FIG. 3 is a schematic illustration of an electric motor which may be used to power a frac pump, according to an embodiment of the disclosure.

Electric motor 34 may have a variety of configurations depending on the parameters of a given fracturing or other treatment operation. However, an example of electric motor 34 is illustrated in FIG. 3 as comprising a stator 54, e.g. a non-rotating stator, and a rotating group referred to as a rotor 56. In this example, the rotor 56 rotates in a direction indicated by arrow 58. The kinetic energy stored in this system (Ke) is equal to one half the product of the rotational moment of inertia (I) and the square of the rotational speed (w). The rotational moment of inertia has a strong functional relationship to diameter. For example, doubling the diameter of the rotational components quadruples the rotational moment of inertia. Thus, much more energy is stored in large diameter objects rotating fast than in small diameter objects rotating slowly.

Figure 4:
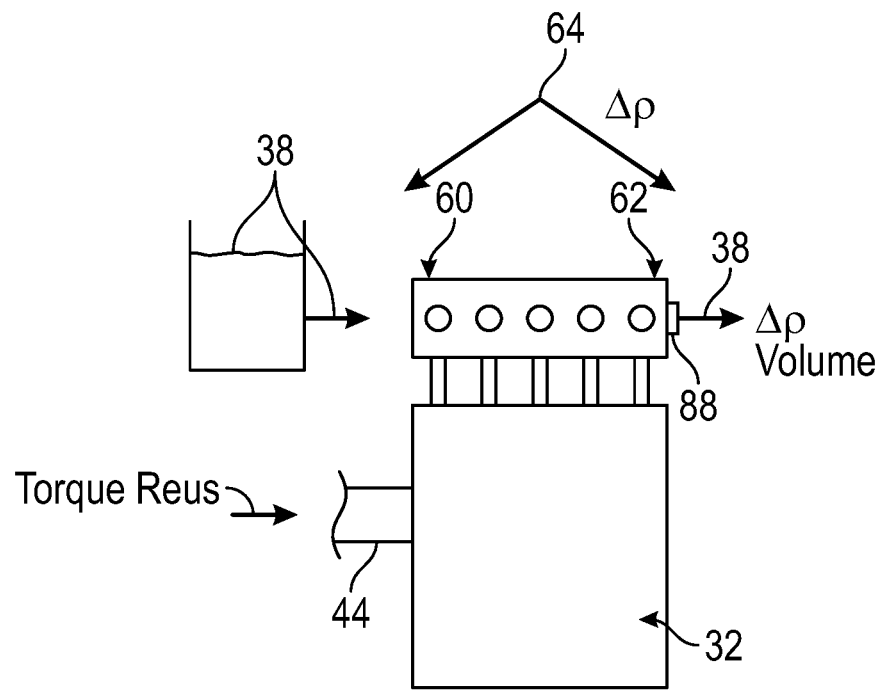
FIG. 4 is a schematic illustration of an example of an electric frac system having a fracturing pump to pump the fluid downhole, according to an embodiment of the disclosure.

Referring generally to FIG. 4, an example of frac pump 32 is illustrated as driven by input shaft 44 which accepts torque and shaft rotations from electric motor 34. The frac pump 32 delivers fluid volumes proportional to the shaft rotations, e.g. proportional to rotations of input shaft 44. The torque for rotating the shaft 44 is approximately equal to a constant multiplied by the pressure difference between a pump input 60 and a pump output 62. The pressure difference between the pump input and output is indicated by arrows 64. As discussed above, the pumping action which creates this pressure difference also can be used to help brake the electric fracturing system 30 during, for example, an emergency stoppage.

Figure 5:
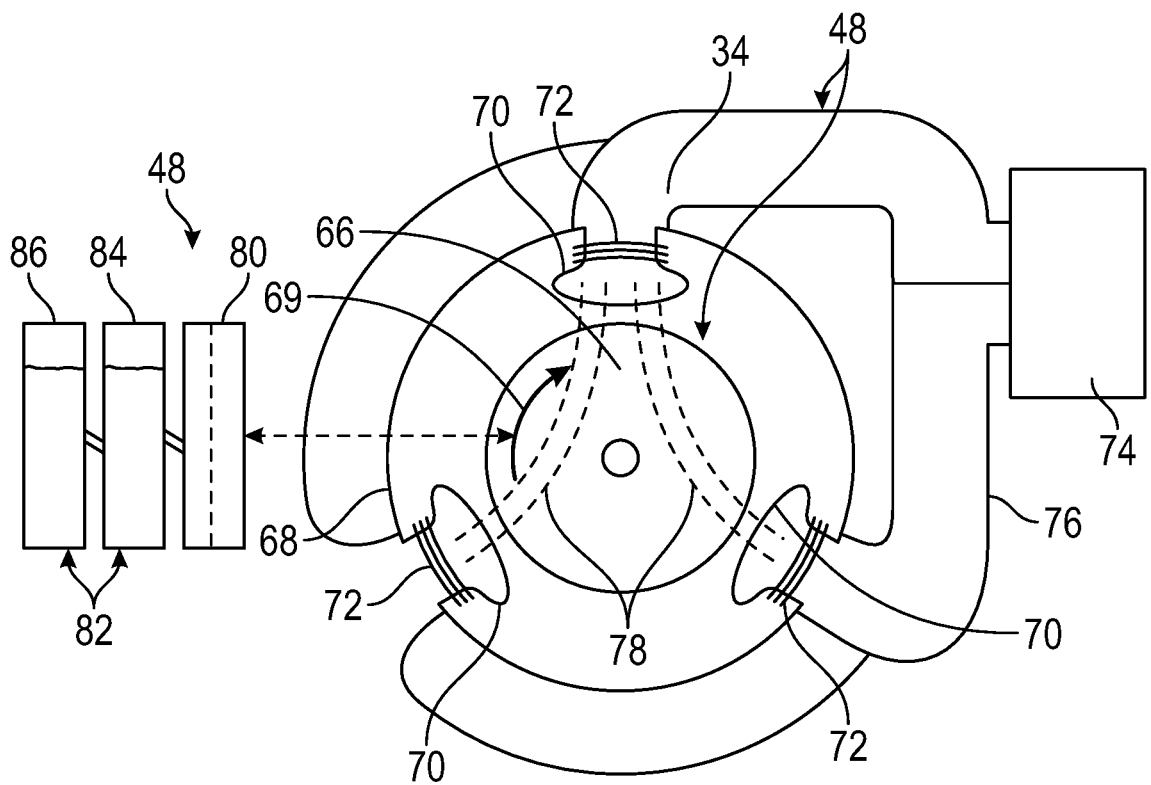
FIG. 5 is a schematic illustration of an example of an electromagnetic braking system combined with an electric motor for use with an electric frac system, according to an embodiment of the disclosure.

Referring generally to FIG. 5, an example of electric motor 34 coupled with energy dissipation system 48 is illustrated. In this embodiment, electric motor 34 comprises a motor rotor 66 rotatably disposed in a stationary stator 68. The rotor 66 may rotate in the direction indicated by arrow 69. As illustrated, the stator 68 has stator poles 70 which carry windings 72, e.g. stator coils. A controller 74 may be used to provide current which is applied through wires 76 to feed the stator windings/coils 72. In some embodiments, controller 74 comprises a variable frequency drive (VFD). When current is applied to stator windings/coils 72, a magnetic field 78 is produced through the rotor 66. When rotor 66 rotates through this magnetic field 78, eddy currents are produced in the rotor 66 and these currents act to retard rotation of rotor 66.

The magnetic field 78 initiated via controller 74 and the currents it produces in rotor 66 effectively brake rotation of the rotor 66. This braking action serves to further slow rotation of electric motor 34 and thus frac pump 32. However, the braking action occurs as energy is dissipated in the rotor 66 and this causes the rotor 66 to heat up. It should be noted the braking action depends on the rotational speed of the rotor 66 and falls off as the rotational speed of rotor 66/electric motor 34 slows. In various embodiments, the braking mechanism may be a combination of the rotor drag resulting from the magnetic field 78 and from the resistance created by the pumping action of frac pump 32.

The rotor drag is produced by applying a non-rotating magnetic field 78 and/or a slowly rotating magnetic field 78 to the stator 68. Application of the non-rotating and/or slowly rotating magnetic field produces braking eddy currents in the rotor 66. When the magnetic field is non-rotating, the braking may be referred to as DC injection braking. This type of braking is highly effective particularly at high motor speeds and does not require additional hardware to implement the braking. In other words, existing fracturing system components may be used in a manner enabling the desired braking without requiring expensive additional components that would only be used during a rare event. The power dissipation from the rotor drag/braking is done in the electric motor itself. Utilizing magnetic field 78 as described herein effectively provides a high-capacity braking system, e.g. a braking system capable of removing at least half of the rotating inertial energy, without the addition of components dedicated only to braking.

Applying a slowly rotating magnetic field enables spreading of the drive power load over more semiconductors and over more of the windings 72. If the magnetic field is rotating opposite the rotation of electric motor 34/rotor 66, positive energy will be delivered. If the magnetic field is rotating in the same direction as the electric motor 34/rotor 66 and at a rotational speed less than the rotor speed, power is generated. The power generated may be directed into a DC link located in, for example, a variable frequency drive (VFD) of controller 74. This causes the DC link voltage to rise and encourages use of additional mechanisms for dissipating this energy.

In some embodiments, a brake chopper 80 may be used to feed energy from the DC link to a braking resistor or resistors 82. If an electric grid is available, the energy can be fed back into the grid as a type of regenerative braking. However, wellsites may be located such that the grid is unavailable. One aspect associated with this embodiment and this type of regenerative braking is use of a brake chopper 80 having substantial current and power capability. The brake resistor 82 may be selected so as to be capable of dissipating the energy associated with full electric motor horsepower or some smaller share of the electric motor horsepower. Furthermore, the braking resistor 82 may be constructed to handle all or part of the total energy stored in the rotor 66 at full speed rather than having the ability to dissipate high, continuous power.

According to an embodiment, at least some of the braking capacity may be achieved via regeneration. However, various embodiments dump the bulk of the energy from braking into the rotor 66 using DC injection on the stator windings/coils 72. Also, some of the energy/heat generated via braking may be dissipated via the brake resistors 82. For example, brake resistors 82 may comprise heating elements that are already present in a given electric fracturing system 30, such as an oil heater 84 and a motor heater 86.

In one embodiment, the oil heater 84 and motor heater 86 may be used to dissipate substantial energy resulting from the braking, e.g. 10-20 kW via the addition of a 10-20 kW chopper 80. In some embodiments, however, the energy dissipated in stopping electric motor 34, e.g. a 5000 hp motor running at 1800 RPMs, does not heat the rotor 66 to an unacceptable level. Motor blowers or other fans/coolers may continue to run after the electric motor 34 is stopped to facilitate continued cooling. It should be noted that a pressure release mechanism 88, e.g. a burst disc, (see FIG. 4) may be positioned at one or more suitable locations so that pressure of the pumped fluid is released if the pressure spikes above a predetermined level.

Accordingly, the electric fracturing system 30 may comprise frac pump 32, electric motor 34, and energy dissipation system 48, e.g. a regenerative system with a chopper/brake resistor. The energy resulting during a pressure trip or emergency stop may be dissipated via a combination of pumping and braking due to DC injection into the rotor (with an alternate/additional route directing the energy into a chopper/braking resistor). This type of braking is able to at least cut in half the volume of fluid that would otherwise be pumped via pump 32 during an emergency stop (assuming full braking torque on the electric motor 34 at speed).

In some embodiments, multiple frequencies may be used to achieve the desired braking. This type of multi-frequency braking may be used with suitable electric motors 34 such as AC motors. According to one example, such an AC motor 34 may be braked by applying two different frequencies to the motor simultaneously. This approach utilizes two sets of voltage values imposed on the operating electric motor 34 so as to provide substantial braking torque for slowing and stopping electric motor 34 (as well as stopping the frac pump 32). Effectively, rotor drag on the electric motor 34 is achieved by applying multiple frequencies of rotating magnetic fields to the stator 54 to produce braking eddy currents in the rotor 56.

In this type of multi-frequency braking embodiment, the energy for braking the electric motor 34 may be dumped into the motor 34, e.g. into the motor rotor 66, and sometimes into additional brake resistor components such as the oil heater 84 and motor heater 86. A variety of motor drives which may be used with electric motor 34 are able to follow voltage commands for achieving the multi-frequency braking. In some applications, the multi-frequency, e.g. dual-frequency, AC injection may actually provide more braking torque than achieved by using DC injection.

The pressure release mechanism 88 provides a mechanism for limiting the peak pressure in the event of, for example, a low volume system. Additionally, the mechanisms for coupling the DC link to the drive systems for the various blowers, pumps, and other components of the electric fracturing system 30 also may be used to accept additional braking power, e.g. up 150 kW of additional braking power.

The embodiments described herein may be used with a variety of electrically powered fracturing systems to effectively deliver rapid stopping ability without requiring expensive additional components that would only be used in a rare event. For example, an existing VFD may be utilized in achieving the DC injection type braking and/or the frequency related braking as described above. Similarly, the rotor 66 also is a component that would be present in the system and can be used in conjunction with magnetic fields 78 to apply the desired braking as described herein. It should be noted embodiments of the braking system described herein may be constructed for limited or occasional service rather than repeated service so as to lower system costs.

Depending on the parameters of a given fracturing operation, the components of electric fracturing system 30 may vary. For example, the size and configuration of frac pump 32, electric motor 34, controller 74, and energy dissipation system 48 may change according to the characteristics of the particular fracturing operation. In some embodiments, the controller 74 may comprise a VFD and/or other suitable control components for controlling operation of electric motor 34 and other components of fracturing system 30. The illustrated components of electric fracturing system 30 also may be supported by a variety of other components, including fans, radiators, cooling circuits, and various electrical components. Similarly, the energy dissipation system 48 may utilize various types of magnetic fields to apply a desired rotor drag for braking the system. Additionally, the energy dissipation system 48 may utilize various types of DC injection braking, regenerative braking, or various combinations of braking to facilitate stoppage of frac pump 32 and electric motor 34 while limiting pumping of fluid after an emergency stop event occurs.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A method for controlling aspects of a fracturing operation, comprising:
   coupling an electric motor with a fracturing pump;
   pumping a fracturing fluid into a well by operating the fracturing pump via the electric motor; and
   facilitating rapid stoppage of the fracturing pump and the electric motor by applying rotor drag to a rotor of the electric motor, wherein applying rotor drag comprises applying a non-rotating magnetic field to a stator of the electric motor to produce braking eddy currents in the rotor via DC injection braking.

2. The method as recited in claim 1, wherein applying the magnetic field comprises applying a slowly rotating magnetic field and the non-rotating magnetic field to the stator.

3. The method as recited in claim 1, wherein facilitating stoppage comprises using resistance resulting from the pumping action.

4. A method, comprising:
   coupling an electric motor with a fracturing pump;
   providing the electric motor with a rotor and a stator having stator windings;

electrically connecting a controller to the stator windings; and configuring the controller to simultaneously apply multiple frequencies of rotating magnetic fields to the stator so as to produce braking eddy currents in the rotor to create rotor drag.

5. The method as recited in claim 4, further comprising controlling dissipation of energy resulting from applying the multiple frequencies of the rotating magnetic fields, wherein controlling dissipation of energy comprises dumping energy to the rotor using DC injection on stator coils of the stator.

6. The method as recited in claim 5, further comprising directing energy resulting from applying the multiple frequencies of the rotating magnetic fields to heating elements.

7. The method as recited in claim 6, wherein directing energy to heating elements comprises directing energy to at least one of an oil heater and a motor heater.

8. The method as recited in claim 4, wherein coupling comprises coupling the electric motor to the fracturing pump with a shaft and a gearbox.

9. The method as recited in claim 4, further comprising operating the fracturing pump via the electric motor to pump fracturing fluid into a well.

10. The method as recited in claim 9, further comprising stopping the electric motor and the fracturing pump during an over-pressure shut down by producing the braking eddy currents.

11. The method as recited in claim 4, further comprising producing the braking eddy currents by applying a non-rotating magnetic field to the stator.

12. The method of claim 4, wherein the controller is configured to apply two different frequencies to the motor simultaneously.

13. The method of claim 12, wherein the two different frequencies utilizes two sets of voltage values imposed on the motor.

14. A system, comprising:

an electric motor having a rotor and a stator with stator windings;

a fracturing pump coupled to the electric motor and powered by the electric motor when pumping a fracturing fluid; and a controller configured to apply DC injection braking via a non-rotating magnetic field and a slowly rotating magnetic field to the stator so as to produce braking eddy currents in the rotor to create rotor drag sufficient to rapidly stop rotation of the rotor, the DC injection braking thus providing a high-capacity braking system without the addition of components dedicated only to braking.

15. The system as recited in claim 14, wherein the fracturing pump is coupled to the electric motor through a gearbox.

16. The system as recited in claim 14, further comprising heating elements which dissipate energy during stoppage of the electric motor via the rotor drag.

17. The system as recited in claim 14, wherein the slowly rotating magnetic field is rotating in the same direction as the electric motor rotor and at a rotational speed less than a rotational speed of the electric motor rotor speed, thereby generating power.

18. The system as recited in claim 17, wherein the power generated by the slowly rotating magnetic field is directed into a DC link located in a variable frequency drive (VFD) of the controller.

19. The system as recited in claim 14, wherein the rotor drag is created within the electric motor.

20. The method of claim 14, wherein the controller is configured to apply two different frequencies to the motor simultaneously.

* * * * *